United States Patent
Parild et al.

(10) Patent No.: US 8,869,955 B2
(45) Date of Patent: Oct. 28, 2014

(54) ANTI-SQUEAL SHIM

(75) Inventors: Mats Parild, Kalmar (SE); Pierre Josefsson, Kalmar (SE)

(73) Assignee: Trelleborg Sealing Solutions Kalmar AB, Kalmar (SE)

(*) Notice: Subject to any disclaimer, the term of this patent is extended or adjusted under 35 U.S.C. 154(b) by 1203 days.

(21) Appl. No.: 12/597,379

(22) PCT Filed: Apr. 25, 2007

(86) PCT No.: PCT/SE2007/050270
§ 371 (c)(1),
(2), (4) Date: Jan. 29, 2010

(87) PCT Pub. No.: WO2008/133556
PCT Pub. Date: Nov. 6, 2008

(65) Prior Publication Data
US 2010/0140029 A1 Jun. 10, 2010

(51) Int. Cl.
*F16D 69/00* (2006.01)
*F16D 65/00* (2006.01)
*F16D 65/097* (2006.01)

(52) U.S. Cl.
CPC ........ *F16D 65/0971* (2013.01); *F16D 65/0006* (2013.01); *F16D 65/0972* (2013.01); *F16D 2200/0056* (2013.01); *F16D 65/0012* (2013.01); *F16D 2200/006* (2013.01)
USPC .................................. 188/251 A; 188/251 M

(58) Field of Classification Search
USPC ....... 188/73.37, 250 B, 250 C, 250 E, 251 A, 188/250 G, 251 M
See application file for complete search history.

(56) References Cited

U.S. PATENT DOCUMENTS

| 4,787,610 | A | | 11/1988 | Kojima et al. | |
| 5,099,962 | A | * | 3/1992 | Furusu et al. | 188/73.37 |
| 5,100,096 | A | | 3/1992 | Mizuno et al. | |
| 5,407,034 | A | * | 4/1995 | Vydra et al. | 188/73.37 |
| 5,515,950 | A | * | 5/1996 | Kwolek | 188/73.36 |
| 5,939,179 | A | | 8/1999 | Yano et al. | |
| 6,041,893 | A | | 3/2000 | Ervens et al. | |
| 6,105,736 | A | | 8/2000 | Akita et al. | |
| 6,170,620 | B1 | * | 1/2001 | Akita et al. | 188/251 A |
| 6,481,545 | B1 | * | 11/2002 | Yano et al. | 188/264 G |
| 6,524,681 | B1 | * | 2/2003 | Seitz et al. | 428/143 |

(Continued)

FOREIGN PATENT DOCUMENTS

| AU | 646174 | 2/1994 |
| DE | 102005002762 A1 | 1/2005 |

(Continued)

OTHER PUBLICATIONS

Rogers Corporation, Noise Reduction Through Vibration Isolation, BISCO(r) Silicones Tutorial, Publication #180-140,.

*Primary Examiner* — Christopher Schwartz
(74) *Attorney, Agent, or Firm* — Pierce Atwood LLP; Kevin M. Farrell; Robert L. Hover

(57) ABSTRACT

Anti-squeal shim (100) comprising a fiber reinforced vibration insulating layer (110) and a vibration absorbing layer (120), the fiber reinforced vibration insulating layer comprises reinforcement fibers, a filler material and a binder material. There is also provided a method of producing anti-squeal shims, and a method of preventing squeal noise from a disc brake.

10 Claims, 6 Drawing Sheets

(56) References Cited

U.S. PATENT DOCUMENTS

| | | |
|---|---|---|
| 2004/0188190 A1* | 9/2004 | Niwa et al. ................ 188/73.37 |
| 2004/0222055 A1 | 11/2004 | Niwa et al. |
| 2005/0094311 A1 | 5/2005 | Boss et al. |
| 2007/0045063 A1 | 3/2007 | Naito et al. |

FOREIGN PATENT DOCUMENTS

| | | | |
|---|---|---|---|
| EP | 0423057 | A2 | 4/1991 |
| EP | 0734853 | A2 | 10/1996 |
| EP | 0734853 | A3 | 3/1997 |
| EP | 0921330 | A2 | 6/1999 |
| EP | 1245851 | B1 | 5/2006 |
| EP | 1455109 | B1 | 11/2006 |
| GB | 1414915 | A | 11/1975 |
| GB | 2129511 | A | 5/1984 |
| GB | 2190968 | A | 12/1987 |
| JP | 58195129 | U | 12/1983 |
| JP | 63101530 | A | 5/1988 |
| JP | 1234627 | A | 9/1989 |
| JP | 7502329 | A | 7/1993 |
| JP | 6094057 | A | 4/1994 |
| JP | 7071519 | A | 3/1995 |
| JP | 8109935 | A | 4/1996 |
| JP | 8232998 | A | 9/1996 |
| JP | 01065943 | U | 4/1998 |
| JP | 2002295548 | A | 10/2002 |
| JP | 2004286210 | A | 10/2004 |
| JP | 2004301157 | A | 10/2004 |
| WO | 9313329 | A1 | 7/1993 |

* cited by examiner

Pad side　　　　　　　　　　　　　　　　Outer side

Pad side                        Outer side

ANTI-SQUEAL SHIM

THE FIELD OF THE INVENTION

The present invention relates to an anti-squeal shim, more in detail the invention relates to an anti-squeal shim comprising a fibre reinforced vibration isolating layer.

BACKGROUND OF THE INVENTION

Disc brake squeal is a high pitch sound/vibration originating from a vehicle's braking system. The squeal may occur frequently depending on car make, brake design and weather conditions. The trend by car builders is to use less weight in the brake and the body of the car which aggrevates the occurance of brake noise.

Noise problems in braking systems have occurred since the automobile came into existance. In the early days there were so many other noises from a car that brake noise was never considered a problem. In the late 1960's and early 70's car manufacturers started using disc brakes drastically decreasing the stopping distances. Initially, the majority of the brake pads contained asbestos as a main component, which resulted in little brake noise problems. Today essentially all major car manufacturers world wide have eliminated the use of asbestos following legislation of environmental issues. Instead, most manufacturers are using semi-metallic friction materials in their brake pads. This metal-to-metal contact with the brake disc has often increased the noise generation.

In order to reduce or eliminate brake squeal, today, nearly all the cars being manufactured around the world contain brake pads equipped with anti-noise shims/insulators/dampers to eliminate brake squeal.

The squeal-noise generated by disc brakes is a vibration that is the result of the brake assembly parts vibrating at high frequency. Studies show that squeal can occur from a number of possible sources. The most common sources are: brake caliper components, friction material of brake pads and disc rotors.

To reduce or eliminate brake squeal noise, anti-squeal shims are provided in between the caliper and the backing plate of the brake pads. Such anti-squeal shims are conventionally comprised of a steel plate with damping material layers applied on both faces thereof. In most cases, the damping material layers of the anti-squeal shims is formed of rubber and selected to be about 100 μm thick. The Japanese Patent Publication No. Showa 63-101530, discloses an anti-squeal shim is wherein the damping material layers are formed of a compound including a nonmetal fibre other than asbestos, an elastomer and a filler. The fibre reinforced damping material layers are about 100 μm, and are shown to have improved wear resistance compared to non reinforced rubber. U.S. Pat. No. 6,105,736 discloses an anti-squeal shim comprising a metal plate and a fibre reinforced compound layer applied only to the brake pad side of the metal plate whereas the piston side of the metal plate is in direct contact with the piston. The fibre reinforced compound includes a nonmetal fibre other than asbestos, an elastomer and a filler. The thickness of the compound layer is determined to be from 200 to 800 micron. The disclosed anti-squeal shim is disposed between the brake piston and the backing plate of the friction pad with the metal plate opposed to the piston without the intervention of a backing-up shim and with the compound layer opposed to the backing plate. In U.S. Pat. No. 6,105,736 it is stated that when the compound layer is thinner than 200 micron, satisfactory vibration damping properties can not be obtained, while when it is thicker than 800 micron, a stress relaxation is liable to occur in the anti-squeal shim.

SUMMARY OF THE INVENTION

The object of the invention is to provide a new anti-squeal shim which overcomes the drawbacks of the prior art. This is achieved by the anti-squeal shim and related methods as defined in the independent claims.

Advantages with the anti-squeal shim according to the present invention are that it provides excellent anti-squeal performance, whilst being durable, and well suited for mass production.

Embodiments of the invention are defined in the dependent claims.

BRIEF DESCRIPTION OF THE DRAWINGS

The invention will be described in detail below with reference to the drawings, in which:

FIGS. 2a to 2h schematically show a number of embodiments of anti-squeal shims.

DETAILED DESCRIPTION OF PREFERRED EMBODIMENTS

Figure 1:
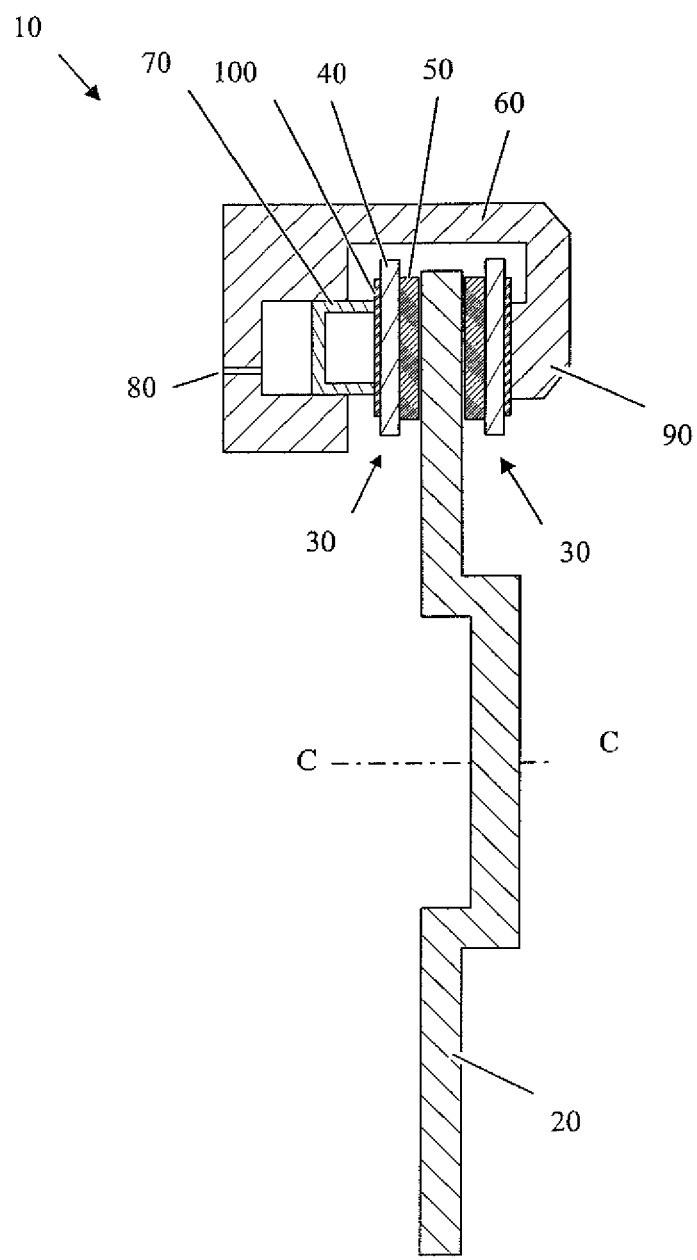
FIG. 1 shows a schematic example of a disc brake.

FIG. 1 shows a schematic example of a disc brake 10 comprising a disc 20 arranged to rotate about the axis C-C. A pair of brake pads 30 each having a backing plate 40 supporting a friction member 50 on the disc side thereof, a brake calliper 60 supporting the brake pads 30 movably toward and away from opposite friction surfaces of the disc 20, and hydraulic actuating means in the form of a brake piston 70 for urging the brake pads against the disc. The brake piston 70 is hydraulically actuated via the fluid path 80 connected to the hydraulic brake system of a vehicle. In the disclosed embodiment, the disc brake 10 the calliper housing 60 is moveable in the actuation direction of the brake piston, whereby the brake pad on the non piston side is urged against the disc by a calliper finger 90 of the calliper housing 60. An anti-squeal shim 100 is arranged adjacent the backing plate 40 of each disc pad 30 and the brake force from the brake piston 70 and calliper finger 65 respectively is transferred to the brake pads 30 via the anti squeal shims 100.

Throughout this description, the expression "pad side" refers to the side of an anti squeal shim 100 that face the backing plate 40 of a brake pad 30 and the expression "outer side" refers to the non pad side, i.e. the side that faces the piston 70 or the calliper finger 90. In some disc brake designs, the calliper finger 90 is omitted and the calliper 60 is provided with brake pistons 70 on both sides of the disc 20. However, throughout this description, the above expressions include any such non disclosed disc brake arrangements.

Figure 2A:
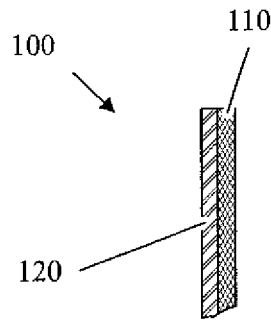

In the prior art, fibre reinforced layers in anti-squeal shims, are mainly regarded as vibration damping layers, and the thickness of such fibre reinforced layers is selected so that desired damping properties are achieved, e.g. a total thickness exceeding 200 μm. However, the applicants have found that such fibre reinforced materials alone cannot provide damping properties that meet current demands in the art even at a thickness well exceeding 200 μm, unless being excessively thick, but that such fibre reinforced materials exhibit excellent properties with respect to vibration insulation even as a thin layer. According to one embodiment, e.g. FIG. 2a, there is provided an anti-squeal shim 100 comprising a fibre reinforced vibration insulating layer 110 and a vibration absorbing layer 120. The fibre reinforced vibration insulating layer 110 comprises reinforcement fibres, a filler material and a binder material and will be discussed more in detail below. As is previously mentioned, the fibre reinforced layer 110 exhibits excellent vibration insulating properties, comparable with conventional vibration insulating materials, such as rubber. As is evident from above, the term vibration insulating, does not solely refer to materials being purely vibration insulating, but rather materials that are predominantly vibration insulating and to some degree vibration absorbing or damping. Consequently, the term vibration absorbing material as is used herein refers to materials that are predominantly vibration absorbing, but which also are vibration insulating.

According to one embodiment, the shim 100 has a pad side and an outer side wherein the fibre reinforced vibration insulating layer 110 is arranged at the outer side, and the vibration absorbing layer 120 at the pad side thereof. By this arrangement, the vibration absorbing layer 120 is constrained in between the vibration insulating layer 110 and the backing plate 40 of the brake pad 30

As mentioned, the fibre reinforced vibration insulation layer 110 comprises reinforcement fibres, a filler material and a binder material. According to one embodiment, the binder material is an elastomeric binder, but it may also be a non-elastomeric resin type binder. Compared to conventional rubber materials, the reinforcement fibres make the material stronger and less elastic in the plane without considerably affecting the compression characteristics in the normal direction. Moreover, the fibres and the filler reduce the amount of elastomeric binder in the layer, thereby making the layer less expensive. According to one embodiment, the fibre content in the fibre reinforced vibration insulation layer is more than 10%, or 14%, and less than 23% or 30% by weight. However, for some applications the fibre content may be higher than 30%, such as up to 50% or even up to 80%. The reinforcement fibres are selected from organic fibres depending on the specific application. Examples of organic fibres include: aromatic polyamide fibres, polyamide fibres other than aromatic polyamide fibres, polyolefine fibres, polyester fibres, polyacrylonitrile fibres, polyvinyl alcohol fibres, polyvinylchloride fibres, polyurea fibres, polyurethane fibres, polyfluorocarbon fibres, phenol fibres, cellulosic fibres, or the like. According to one embodiment, the reinforcement fibres comprises cellulose fibers and/or aromatic polyamide fibers.

The filler material may be an inorganic filler material such as clay, ash, talc, barium sulfate, sodium bicarbonate, graphite, lead sulfate, tripoli, wollastonite, or an organic filler. The binder material may be an elastomeric material of rubber type such as styrene-butadiene rubber (SBR), acrylonitrile-butadiene rubber (nitrile rubber, NBR), isoprene rubber (IR), chloroprene rubber (CR), butadiene rubber (BR), isobutylene-isoprene rubber (IIR), ethylene propylene rubber (EPM), fluoro rubber (FPM), silicone rubber (Si), chlorosulfonated polyethylene (CSM), ethylene-vinylacetate copolymers (EVA), chlorinated polyethylene (CPE), chloro-isobutane-isoprene rubber (CIIR), epichlorohydrin rubber (ECO), nitrile isoprene rubber (NIR) or the like. Elastomers other than rubbers may also be used. According to alternative embodiments the binder material is a resin type material such as a rubber modified phenolic resin, a phenolic resin, an epoxy resin or the like.

Figure 2B:
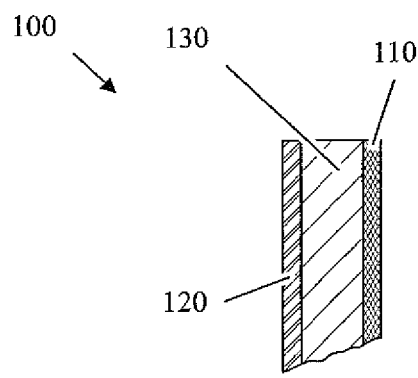
Figure 2C:
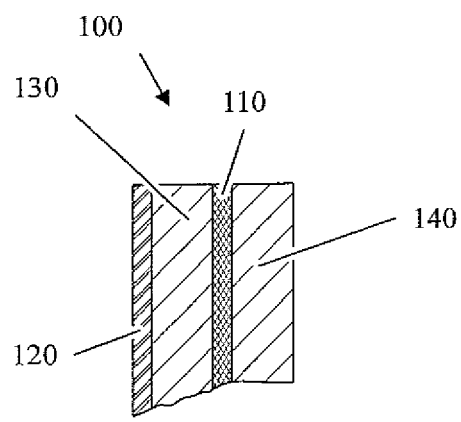

According to one embodiment, the vibration absorbing layer 120 is a visco-elastic layer. The visco-elastic layer may be a visco elastic adhesive such as an acrylic or silicone based adhesive or the like, but it may be any visco elastic material with suitable vibration absorption properties at the conditions that a shim is subjected to when mounted in a disc brake 10. According to one embodiment, e.g. FIG. 2h the vibration absorbing layer 120 is a layer of a viscous media 170 arranged in between two plates of rigid material 180. According to one embodiment, one of the rigid plates is substituted by the backing plate of a brake pad, whereby the shim may be constituted like FIG. 2b but wherein the vibration absorbing layer 120 is a viscous media. According to one embodiment, a fibre reinforced vibration insulation layer 110 can be regarded as a plate of rigid material 180 provided that it is supported by a rigid plate, such as a metal plate. The viscous media is then facing a fibre reinforced vibration insulation layer 110 on at least one side. According to one embodiment, the viscous media is grease or a grease-like compound.

According to some embodiments, e.g. FIGS. 2b to 2h, the anti-squeal shim comprises one or more rigid plates 130 such as metal plates or the like. The rigid plates 130 will function as constraining layers in the shim. Such a metal plate 130 may e.g be comprised of iron, zinc-plated steel, stainless steel, aluminum or the like. According to some embodiments, e.g. FIGS. 2b, 2e and 2f, the anti squeal shim comprises a metal plate 130 and wherein the fibre reinforced vibration insulating layer 110 is arranged on the outer side, and the vibration absorbing layer 120 on the pad side thereof. According to some embodiments, e.g. FIGS. 2e and 2f, the anti squeal shim comprises one or more additional fibre reinforced vibration insulating layer 150.

Figure 2E:
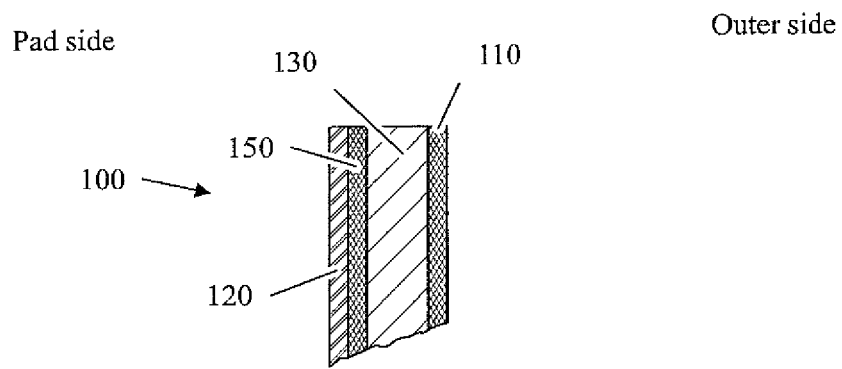
Figure 2F:
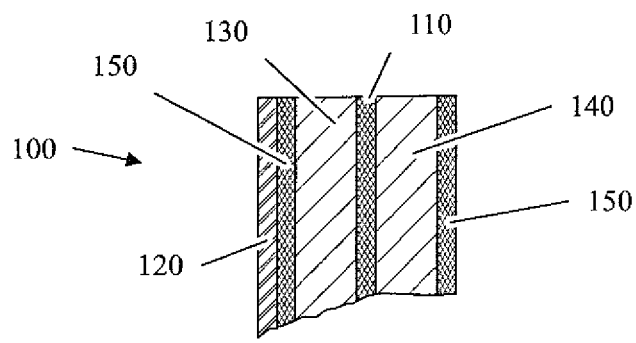
Figure 2G:
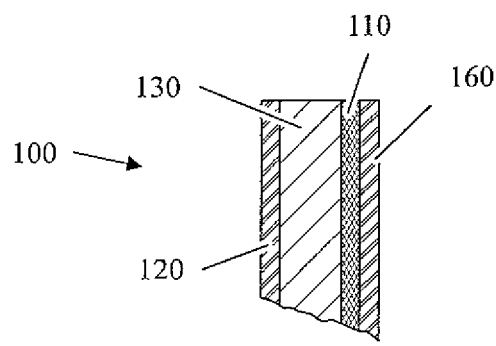

According to one embodiment, e.g. FIG. 2g, the anti squeal shim 100 comprises an additional vibration absorbing layer 160 on the outer side of the shim 100.

In order to achieve desired vibration insulation properties, the fibre reinforced layer is thicker than 110 µm and preferably 130 µm. According to one embodiment, the fibre reinforced vibration insulation layer is thinner than 250 µm, preferably 200 µm, preferably 180 µm, and more preferably 160 µm. It is of great importance that the fibre reinforced vibration insulation layer 110 not is too thin, as the vibration insulation characteristics then will be deteriorated. On the other hand, when the fibre reinforced vibration insulation layer 110 is too thick, the compressibility increases, whereby actuation control of the brakes is deteriorated, especially since the recovery after compression becomes greater and thus takes more time. Moreover a thick insulation layer is subjected to excessive wear and the actuation movement of the brake pistons increased due to the compression of the layer. Additionally the risk for delamination of the fibre reinforced vibration insulation layer increases with the thickness of the layer, especially in cases when the reinforcement fibres predominantly are arranged in the plane of the layer, whereby the strength in the normal direction is more or less limited to the strength of the elastomeric binder.

FIGS. 2a to 2h schematically show a number of embodiments of anti-squeal shims 100 with a fibre reinforced vibration insulation layer 110. The figures shall be regarded as illustrative only, and the relative dimensions of different layers have no significance. FIGS. 2b to 2h disclose embodiments of different configurations with additional and/or alternative layers, resulting in shims with different properties. When the shim is attached to the backing plate of a brake pad, the visco-elastic adhesive serves both to secure the shim and to attenuate/damp the squeal vibrations.

There is also provided a disc brake arrangement comprising a shim according to anyone of the above embodiments between the calliper and the brake pad, and the disc brake may be arranged in a suitable vehicle—such as a car, truck, train, motorbike, bicycle etc.

Figure 3:
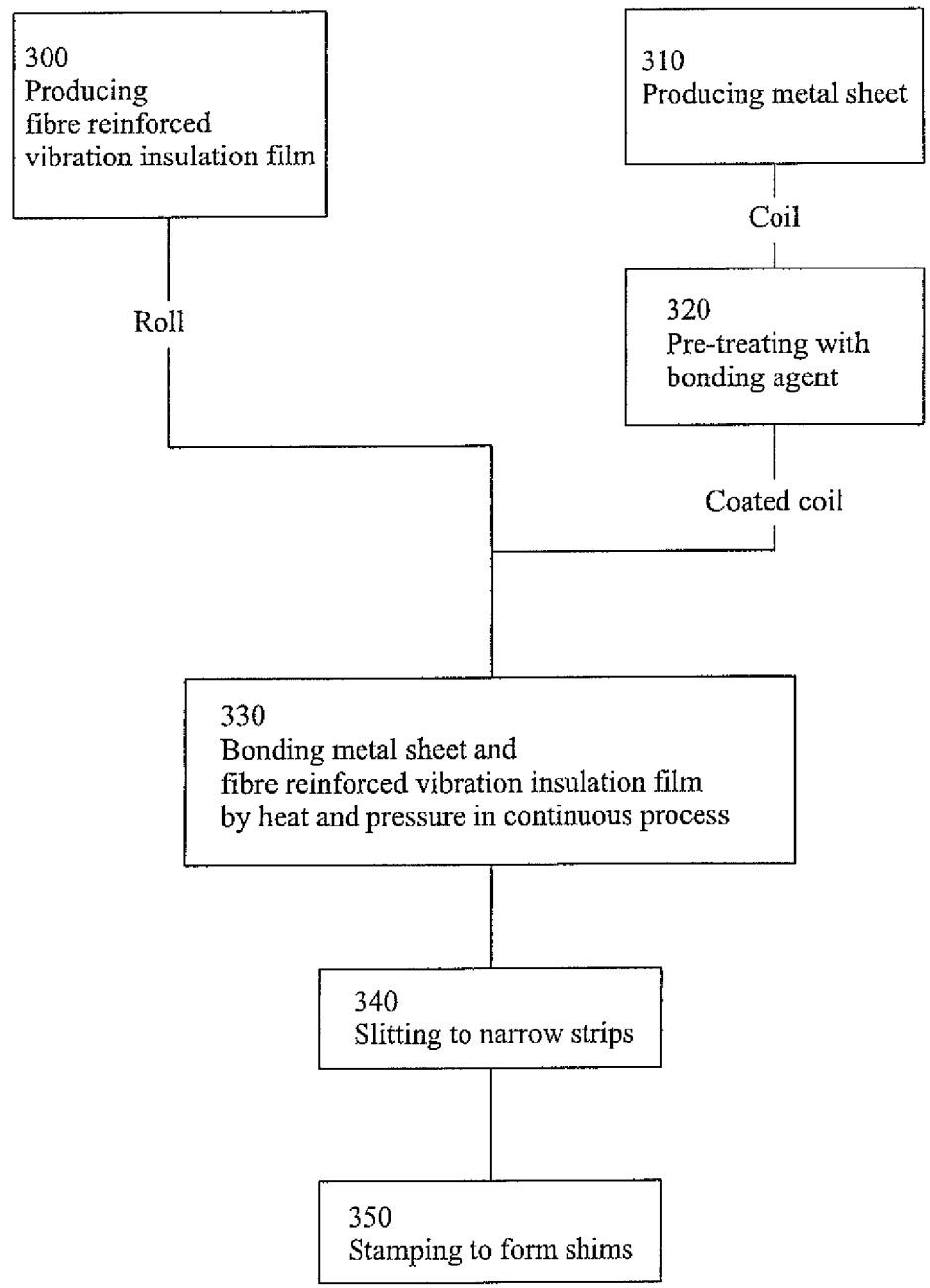
FIG. 3 schematically shows a method of producing anti-squeal shims.

There is also provided a method of producing anti-squeal shims of the type disclosed herein. The steps of the method are schematically shown in FIG. 3 and comprises the steps:

providing a vibration insulating sheet of a fibre reinforced vibration insulating material comprising reinforcement fibres, a filler material and a binder material applying a vibration absorbing layer on at least one side of the vibration insulating sheet to form a shims sheet, and cutting out individual anti-squeal shims from the shims sheet.

By providing the fibre reinforced vibration insulating material in the form of a vibration insulating sheet, the manufacturing process can be greatly enhanced compared to application of a corresponding fiber reinforced vibration insulating layer by a wet application technique followed by cross-linking of the binder in the layer. The fibre reinforced vibration insulating material can be provided in the form of a sheet in any suitable way, as long as vibration insulating and sheet dimension parameters can be provided within specified predetermined limits. According to one embodiment, the fibre reinforced vibration insulating material in sheet form is provided as elongated continuous sheets wound on rolls, and is produced by a paper making process or the like. Due to the nature of such production processes, the so produced vibration insulating sheet can be provided with very narrow tolerances, with respect to dimension and materials properties, at the same time as the process is suitable for mass production and thus cost effective.

The application of the vibration absorbing layer may be performed by a wet application technique or by bonding a preformed vibration absorption film to the surface of the vibration insulating sheet. In order to improve handling properties of the anti-squeal shims with a vibration absorbing layer of visco-elastic type, a protection film may be applied on top of the vibration absorbing layer to prevent dust and dirt from adhering to the surface. According to one embodiment disclosed above in FIG. 2h, the vibration absorbing layer 120 is a layer of a viscous media 170 arranged in between two plates of rigid material 180, then the application of the vibration absorbing layer comprises the additional steps of:

applying a viscous media 170 on the surface of a first rigid plate 180, and arranging a second rigid plate 180 on the viscous media 170.

According to some embodiments, the anti-squeal plate comprises a metal layer 130, and therefore the method of producing comprises the additional steps:

providing a metal sheet, bonding the metal sheet to the vibration insulating sheet, and wherein the vibration absorbing layer is applied on at least one non-bonded side of the vibration insulating sheet and/or the metal sheet.

According to some embodiments, the anti-squeal plate comprises a multi layer vibration insulating structure with one or more constraining metal layer 130 and one or more additional vibration insulating layers 150, and therefore the method of producing comprises the additional steps:

providing one or more metal sheets and one or more additional vibration insulating sheets, alternately bonding the metal sheet(s) and the additional vibration insulating sheet(s) to the vibration insulating sheet, and wherein the vibration absorbing layer is applied on at least one non-bonded side of the vibration insulating sheets and/or the metal sheet(s).

Bonding of different sheets to each other may be performed in any suitable way providing a sufficiently strong bond there between. The bonding may involve the step of applying pressure and/or heat, and it may involve use of a bonding agent, such as resin, cyan, acrylic type adhesive or the like, or by vulcanization. In order for the method to be efficient, the bonding may involve continuous rolling, whereby the metal sheet and the insulation film are provided/produced in the form coils or rolls 310 and 300 respectively.

The step of cutting out individual anti-squeal shims from the shims sheet, may be performed by any suitable method, such as stamping or similar methods. According to one embodiment, the method comprises the step of slitting 340 the coils into narrow coils after the bonding step 330. Thereafter individual shims are cut out from the narrow coils.

In order to achieve a strong bond and to minimize the steps in the bonding operation, the metal sheet may be pre-treating with a bonding agent before the step of bonding. Also the step of pre treating 320 may be performed in a continuous process.

Figure 4:
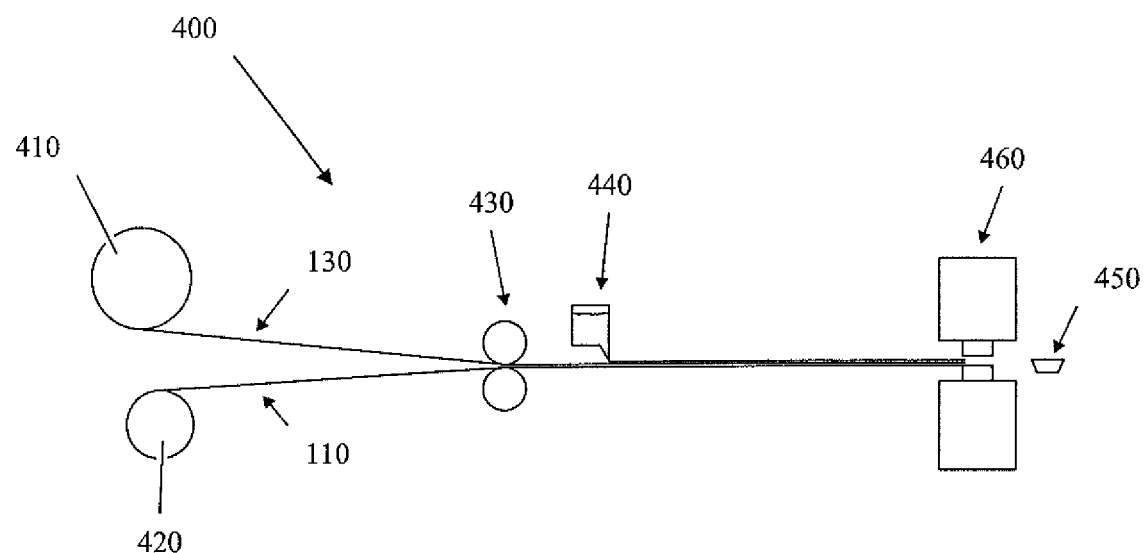
FIG. 4 shows a schematic example of a continuous bonding and cutting process line.

FIG. 4 shows a schematic example of a continuous bonding and cutting process line 400, wherein the vibration insulation sheet 110 and the metal sheet 130 to be bonded together are provided in the form of coils or rolls 410 and 420 respectively. The two sheets 110 and 130 are pressed together and bonded by a pair of calender rolls 430 to form a layered vibration insulating sheet. A vibration absorbing layer 120 is applied on the surface of the layered vibration insulation sheet by a wet application process 440. Finally, individual anti squeal shims 450 are cut out by a stamping machine 460.

In order to fully utilize the shims according to the invention, there is further provided a method to prevent squeal in a disc brake, comprising the step of arranging a shim according to anyone of the above embodiments between the calliper and the brake pad.

What is claimed is:

1. Anti-squeal shim comprising at least one fibre reinforced predominantly vibration insulating layer and at least one predominantly vibration absorbing layer, wherein the at least one fibre reinforced predominantly vibration insulating layer comprises reinforcement fibres, a filler material and a binder material, wherein the at least one fibre reinforced predominantly vibration insulating layer(s) is thicker than 110 μm and thinner than 200 μm, and the fibre content by weight in the fibre reinforced predominantly vibration insulating layer is 80% or less.

2. Anti-squeal shim according to claim 1 wherein the at least one predominantly vibration absorbing layer is a viscoelastic layer.

3. Anti-squeal shim according to claim 2 wherein the viscoelastic layer is an acrylic or silicone based adhesive layer.

4. Anti-squeal shim according to claim 1 wherein the shim has a pad side and an outer side wherein the at least one fibre reinforced predominantly vibration insulating layer is arranged at the outer side, and the at least one predominantly vibration absorbing layer at the pad side.

5. Anti-squeal shim according to claim 1 wherein the reinforcement fibres comprises at least one of organic fibers, aromatic polyamide fibres, polyamide fibres other than aromatic polyamide fibres, polyolefine fibres, polyester fibres, polyacrylonitrile fibres, polyvinyl alcohol fibres, polyvinylchloride fibres, polyurea fibres, polyurethane fibres, polyfluorocarbon fibres, phenol fibres, cellulose fibres, inorganic fibres, glass fibre, ceramic fibre, rock wool, mineral wool, fused quartz fibre, chemical processed high silica fibre, fused alumina silicate fibre, alumina continuous fibre, stabilized zirconia fibre, boron nitride fibre, alkali titanate fibre, whiskers, or boron fibre.

6. Anti-squeal shim according to claim 1 wherein the at least one predominantly vibration absorbing layer is a layer of a viscous media arranged in between two plates of rigid material.

7. Anti-squeal shim according claim 1, further comprising one or more metal plates.

8. Anti-squeal shim according claim 1 wherein the fibre content by weight in the fibre reinforced predominantly vibration insulating layer is 50% or less.

9. Anti-squeal shim according claim 1 wherein the fibre content by weight in the fibre reinforced predominantly vibration insulating layer is 30% or less.

10. Anti-squeal shim according claim 1 wherein the fibre content by weight in the fibre reinforced predominantly vibration insulating layer is 23% or less.

\* \* \* \* \*

UNITED STATES PATENT AND TRADEMARK OFFICE
CERTIFICATE OF CORRECTION

Page 1 of 1

| | |
|---|---|
| PATENT NO. | : 8,869,955 B2 |
| APPLICATION NO. | : 12/597379 |
| DATED | : October 28, 2014 |
| INVENTOR(S) | : Mats Parild and Pierre Josefsson |

It is certified that error appears in the above-identified patent and that said Letters Patent is hereby corrected as shown below:

In the Drawings

Drawing Sheet 3 of 6, the term "Fig. 2e", should read --Fig. 2d--.

Drawing Sheet 3 of 6, the term "Fig. 2f", should read --Fig. 2e--.

Drawing Sheet 3 of 6, the term "Fig. 2g", should read --Fig. 2f--.

Figure 2H:
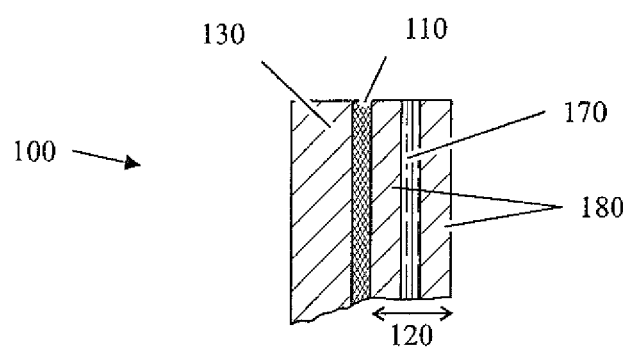

Drawing Sheet 4 of 6, the term "Fig. 2h", should read --Fig. 2g--.

In the Specification

Column 2, line 22, the term "2h", should read --2g--.

Column 4, line 5, the term "2h", should read --2g--.

Column 4, line 19, the term "2h", should read --2g--.

Column 4, line 25, the term "2e and 2f", should read --2d and 2e--.

Column 4, line 29, the term "2e and 2f", should read --2d and 2e--.

Column 4, line 32, the term "2g", should read --2f--.

Column 4, line 56, the term "2h", should read --2g--.

Column 4, line 60, the term "2h", should read --2g--.

Column 5, line 41, the term "2h", should read --2g--.

Signed and Sealed this
Fourteenth Day of April, 2015

Michelle K. Lee
*Director of the United States Patent and Trademark Office*